US 9,797,298 B2

(12) United States Patent
Suzuki et al.

(10) Patent No.: US 9,797,298 B2
(45) Date of Patent: Oct. 24, 2017

(54) ENGINE AIR INTAKE STRUCTURE

(71) Applicant: Fuji Jukogyo Kabushiki Kaisha, Tokyo (JP)

(72) Inventors: Yosuke Suzuki, Tokyo (JP); Hirofumi Imanishi, Tokyo (JP); Masayuki Shimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/240,887

(22) Filed: Aug. 18, 2016

(65) Prior Publication Data
US 2017/0067392 A1 Mar. 9, 2017

(30) Foreign Application Priority Data

Sep. 7, 2015 (JP) ................................ 2015-175438

(51) Int. Cl.
*F02B 31/06* (2006.01)
*F02M 35/10* (2006.01)

(52) U.S. Cl.
CPC ......... *F02B 31/06* (2013.01); *F02M 35/1034* (2013.01); *F02M 35/10255* (2013.01)

(58) Field of Classification Search
CPC .... F02B 31/04; F02B 31/06; F02B 2031/006; F02M 35/10006; F02M 35/10032;
(Continued)

(56) References Cited

U.S. PATENT DOCUMENTS

| 4,762,102 A * | 8/1988 | Kanda ................... F02B 31/085 |
| | | 123/184.45 |
| 6,863,049 B1 * | 3/2005 | Hausknecht ............ F02B 31/06 |
| | | 123/188.7 |

(Continued)

FOREIGN PATENT DOCUMENTS

| JP | 2008-111378 A | 5/2008 |
| JP | 2008-115771 A | 5/2008 |
| JP | 2014-101774 A | 6/2014 |

OTHER PUBLICATIONS

JPO Decision to Grant a Patent dated Nov. 1, 2016 In Japanese Application No. 2015-175438.

*Primary Examiner* — Erick Solis
*Assistant Examiner* — Anthony L Bacon
(74) *Attorney, Agent, or Firm* — McGinn IP Law Group, PLLC

(57) ABSTRACT

An engine air intake structure includes a partition plate and a valve. The plate partitions an air intake passage communicating with an intake port into first and second paths. The valve is disposed in the passage and secured to the shaft. A first path opening is changed variable by the valve. The structure also includes an opposing surface, a stepped surface, an extending surface and a measurement groove. The opposing surface is an inner wall surface of the passage and opposes an end away from the shaft when the opening becomes minimal. The stepped surface is located on the intake port side of the end of the valve at the minimal opening and stands erect from the opposing surface. The extending surface extends from the stepped surface toward the intake port. The measurement groove is formed in the extending surface and extends from the stepped surface toward the intake port.

4 Claims, 4 Drawing Sheets

(58) Field of Classification Search
CPC ....... F02M 35/10091; F02M 35/10124; F02M 35/10255; F02M 35/10262; F02M 35/1034; F02M 35/108
See application file for complete search history.

(56) References Cited

U.S. PATENT DOCUMENTS

| | | | | |
|---|---|---|---|---|
| 7,128,050 | B1* | 10/2006 | Abe | F02B 31/06 123/188.14 |
| 2002/0073961 | A1* | 6/2002 | Tanaka | F02D 9/101 123/336 |
| 2004/0226536 | A1* | 11/2004 | Sakai | F02B 23/08 123/308 |
| 2006/0219202 | A1* | 10/2006 | Abe | F02B 31/06 123/184.56 |
| 2007/0227495 | A1* | 10/2007 | Isaji | F02B 31/06 123/306 |
| 2008/0035094 | A1* | 2/2008 | Torii | F02D 9/103 123/188.14 |
| 2010/0251987 | A1* | 10/2010 | Sano | F02B 31/06 123/184.56 |
| 2011/0107995 | A1* | 5/2011 | Takeda | F02B 31/06 123/184.56 |
| 2013/0152895 | A1* | 6/2013 | Yasuda | F02M 35/108 123/184.54 |
| 2014/0174401 | A1* | 6/2014 | Hattori | F02B 31/06 123/337 |

* cited by examiner

ENGINE AIR INTAKE STRUCTURE

CROSS-REFERENCE TO RELATED APPLICATIONS

The present application claims priority from Japanese Patent Application No. 2015-175438 filed on Sep. 7, 2015, the entire contents of which are hereby incorporated by reference.

BACKGROUND

1. Technical Field

The present invention relates to an engine air intake structure provided with a partition plate that divides an air intake passage of an engine.

2. Related Art

Like the engine disclosed in Japanese Unexamined Patent Application Publication (JP-A) No. 2014-101774, there has been developed a technique by which a partition plate that divides an air intake passage into two paths (first and second paths) is provided in order to generate a tumble (vertical vortex) flow in the intake air flowing into a cylinder. When there is a small amount of intake air flowing through the passage, the first path separated by the partition plate is closed by a tumble generation valve (TGV), thereby speeding up the intake air flowing into a combustion chamber through the second path to generate a tumble flow in the combustion chamber.

In addition, JP-A No. 2014-101774 discloses an example of a structure in which a stepped surface is provided on an inner wall of the first path. When the opening of the TGV is minimized, an end of a TGV valve opposes the stepped surface from the upstream side with a narrow clearance therebetween such that intake air leakage is reduced.

The TGV is operated by an electric motor or other actuator. To protect the actuator, a clearance is provided between the end of the valve and the inner wall surface so that the end of the valve does not come into contact with the inner wall surface when the TGV is placed in a closed position. To check whether such a clearance falls within a design range, a thickness gauge or the like is inserted.

However, if the stepped surface is provided on the inner wall surface of the first path, the clearance between the inner wall surface and the end of the valve is invisible when the first path is viewed from the downstream side, which makes it impossible to measure the clearance even by inserting the thickness gauge into the first path from the downstream side. For instance, if the thickness gauge cannot be inserted into the first path from the upstream side due to curved passage form, it is impossible to measure the clearance.

SUMMARY OF THE INVENTION

Accordingly, it is desirable to provide an engine air intake structure that allows easy measurement of a clearance between a TGV valve and an inner wall surface inside an air intake passage.

A first aspect of the present invention provides an engine air intake structure having a partition plate that partitions an air intake passage in communication with an intake port into a first path and a second path in an intake air flow direction and a plate-like valve that is disposed in the air intake passage and that is secured to the shaft, in which the opening of the first path is variable through the rotation of the valve coupled with the shaft around the shaft, including an opposing surface that is part of an inner wall surface of the air intake passage and opposes an end of the valve with a clearance maintained therebetween when the opening becomes minimal, the end being located away from the shaft, a stepped surface that is located on the intake port side of the end of the valve associated with the opening being minimal and that stands erect from the opposing surface toward the second path, an extending surface that extends from the stepped surface to the intake port side, and a measurement groove that is formed in the extending surface so as to extend from the stepped surface to the intake port side.

A second aspect of the present invention provides the engine air intake structure in which a portion of the inner wall surface of the air intake passage where the valve is disposed may have two shorter portions opposing each other and two longer portions that extend longer than the shorter portions and oppose each other in a cross section perpendicular to the intake air flow direction and in which the opposing surface may be formed in one of the longer portions and the stepped surface may extend from one of the longer portions to a point between the two shorter portions.

A third aspect of the present invention provides the engine air intake structure which may further include an insertion hole that is formed in the two shorter portions of the inner wall surface and through which the shaft is inserted, the insertion hole being formed to pivotally support the shaft, in which, in the shorter portions, the stepped surface may extend to a side of one of the longer portions without extending to the insertion hole.

A fourth aspect of the present invention provides the engine air intake structure in which one of the measurement grooves may be provided in each of one of the longer portions and one of the shorter portions.

DETAILED DESCRIPTION

An example will be described below in detail with reference to the attached drawings. Dimensions, material names, and other specific numerals used in the example are provided for illustrative purposes to enable easier understanding of the present invention and, unless otherwise noted, should not be construed as limitations of the present invention. In this description and the attached drawings, components having substantially the same function or structure have the same numeral and symbol, and repeated descriptions of the same component are omitted. In addition, illustrations of components not directly relevant to the present invention are omitted.

Figure 1A:
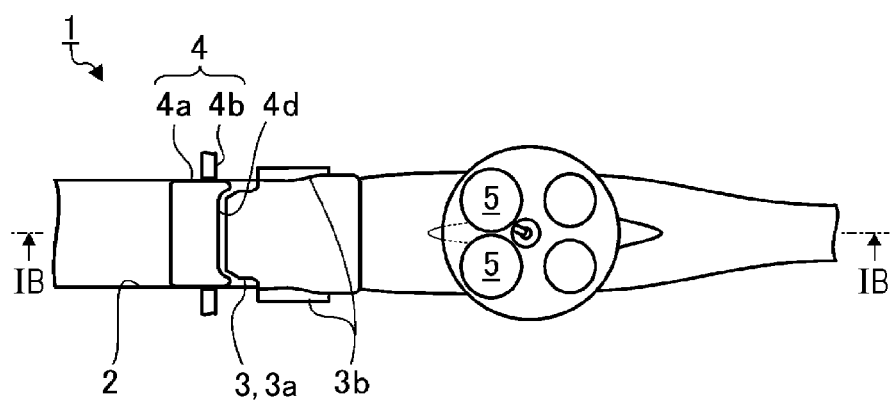
FIGS. 1A and 1B are explanatory diagrams illustrating an engine air intake structure.
Figure 1B:
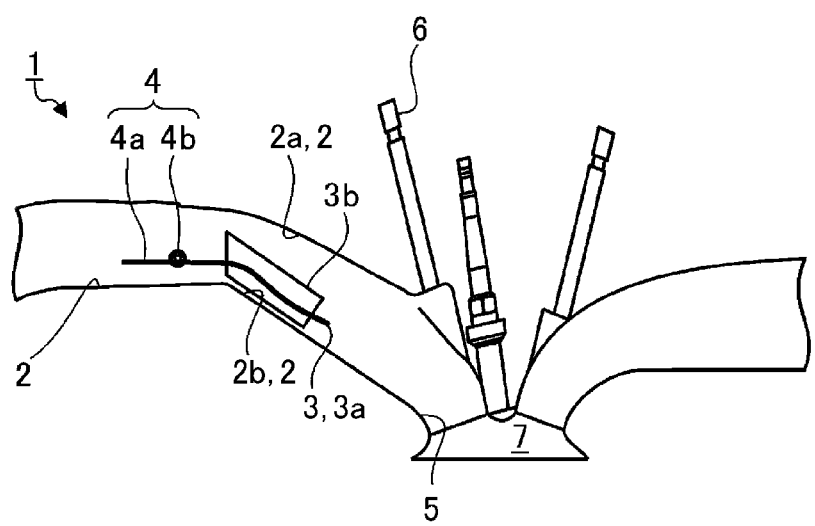

FIGS. 1A and 1B are explanatory diagrams illustrating an engine air intake structure 1. FIG. 1A is a front view of a partition plate 3 disposed in an air intake passage 2. FIG. 1B is a cross-sectional view taken along line IB-IB of FIG. 1A.

As illustrated in FIGS. 1A and 1B, the engine air intake structure 1 includes the air intake passage 2, the partition plate 3, and a tumble generation valve (TGV) 4. The air intake passage 2 is in communication with intake ports 5. The intake ports 5 are opened and closed by air intake valves 6 illustrated in FIG. 1B. When the air intake valves 6 are opened, air flowing into the air intake passage 2 is introduced into a combustion chamber 7 through the intake ports 5.

The partition plate 3 has a plate-like main body 3a. The main body 3a has guide walls 3b formed at both ends thereof in the width direction (vertical direction in FIG. 1A). The guide walls 3b are provided in recesses formed on an inner wall of the air intake passage 2. The partition plate 3 is secured to the air intake passage 2 through the fitting of the guide walls 3b into the recesses.

In addition, the partition plate 3 divides the air intake passage 2 into upper first path 2a and lower second path 2b in the direction in which intake air flows in FIG. 1B. More specifically, the air intake passage 2 is partitioned by the partition plate 3 into the first path 2a and the second path 2b.

As illustrated in FIG. 1B, the partition plate 3 is offset toward a lower part of the air intake passage 2 at a portion where the partition plate 3 is disposed in FIG. 1B, while the upper first path 2a separated by the partition plate 3 is larger in the passage area than the lower second path 2b. The TGV 4 is disposed inside the air intake passage 2 and opens/closes the first path 2a.

Figure 2A:
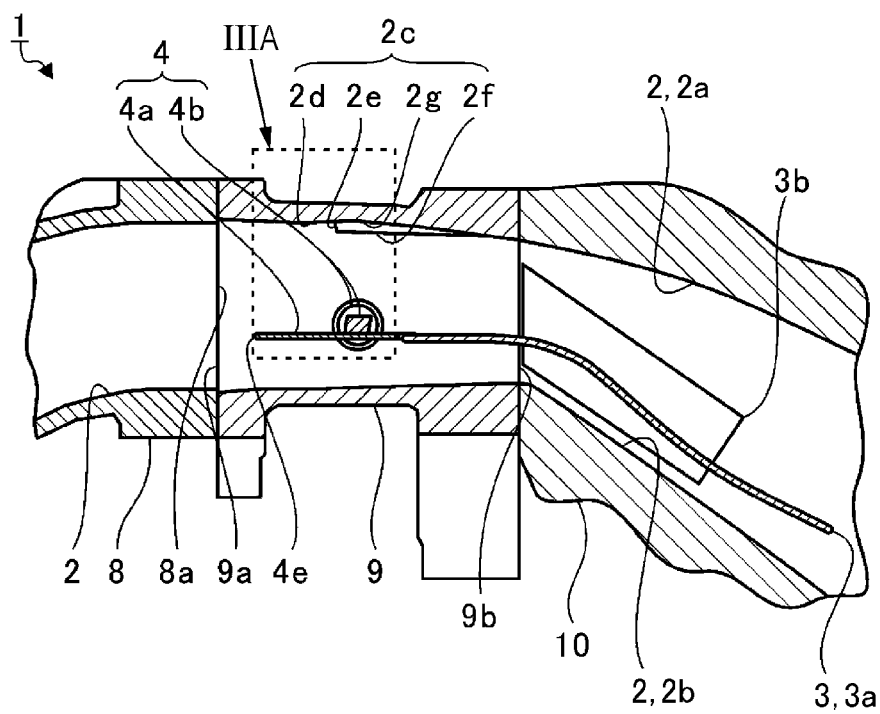
FIGS. 2A and 2B are explanatory diagrams illustrating an TGV opening/closing operation.
Figure 2B:
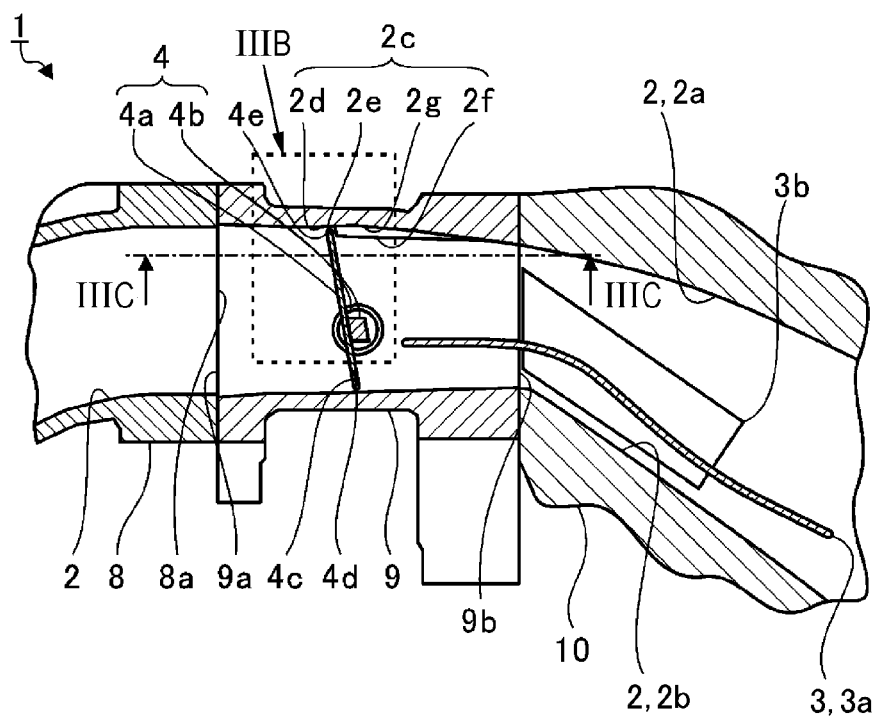

FIGS. 2A and 2B are explanatory diagrams of the TGV 4 opening/closing operation, illustrating the vicinity of the TGV 4 in FIG. 1B. FIGS. 2A and 2B clearly define boundaries between components of the air intake passage 2. As illustrated in FIGS. 2A and 2B, the air intake passage 2 is formed to extend through an intake manifold 8, a supporting member 9, and a cylinder head 10.

Specifically, one end 8a of the intake manifold 8 is coupled to an end 9a of the supporting member 9 such that a passage inside the intake manifold 8 is in communication with a passage inside the supporting member 9. In addition, the other end 9b of the supporting member 9 is coupled to the cylinder head 10 such that the passage inside the supporting member 9 is in communication with the intake ports 5 of the cylinder head 10. Thus, the passages of the intake manifold 8, the supporting member 9, and the cylinder head 10 collectively constitute the air intake passage 2.

The TGV 4 has a substantially plate-like valve 4a (see FIG. 1A) and a shaft 4b. The valve 4a is secured to the shaft 4b and is disposed in the air intake passage 2 at a position corresponding to the supporting member 9. The shaft 4b is pivotally supported at both ends thereof on insertion holes 2i to be described later that are opened to an inner wall surface 2c of the air intake passage 2 and is rotated by an electric motor 4f to be described later (see FIG. 4). The valve 4a is rotated about the shaft 4b together with the shaft 4b such that an opening of the first path 2a becomes variable.

The opening of the TGV 4 is maximized in a state illustrated in FIG. 2A. In this state, the valve 4a extends from the partition plate 3 toward an upstream side. As a result, upper and lower sections of the air intake passage 2 separated by the valve 4a in addition to the partition plate 3 become the first path 2a and the second path 2b, respectively (namely, the first path 2a and the second path 2b are extended toward the upstream side).

In the state illustrated in FIG. 2A, both the first path 2a and the second path 2b are opened. As a result, intake air flowing from the upstream side of the air intake passage 2 to the TGV 4 passes through both the first path 2a and the second path 2b to the combustion chamber 7 without being interrupted by the valve 4a.

On the contrary, in a closed state illustrated in FIG. 2B, the opening of the TGV 4 is minimal such that the first path 2a is nearly closed by the valve 4a of the TGV 4. In addition, the TGV 4 has a clearance provided between a lower end 4c thereof and the inner wall surface 2c of the air intake passage 2 in FIG. 2A and also has a recess 4d formed therein, as illustrated in FIG. 1A, such that intake air passes through the clearance, the recess 4d, and the second path 2b toward the combustion chamber 7.

As illustrated in FIG. 2B, during light-load engine operation with a small amount of intake air, the opening of the first path 2a is narrowed such that most of intake air is made to pass through the second path 2b that is narrower in passage width than the first path 2a. With this arrangement, the engine air intake structure 1 forces faster intake air into the combustion chamber 7 such that a vertical vortex flow (tumble flow) is generated in the combustion chamber 7 to achieve rapid combustion of a fuel and thereby improve fuel economy and combustion stability.

Figure 3A:
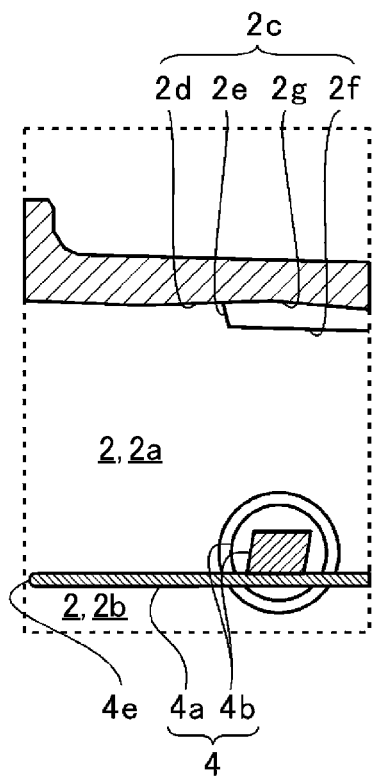
FIGS. 3A, 3B, and 3C are explanatory diagrams illustrating an inner wall surface of a first path.
Figure 3B:
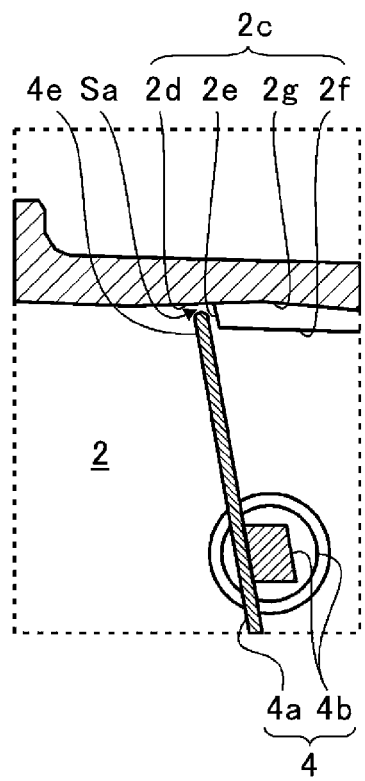
Figure 3C:
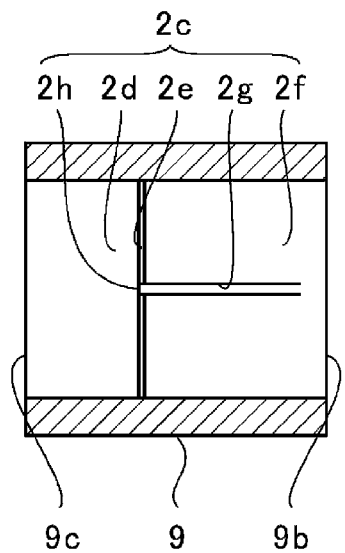

FIGS. 3A, 3B, and 3C are explanatory diagrams illustrating the inner wall surface 2c of the first path 2a. FIG. 3A is an enlarged view of a portion enclosed by dotted lines in FIG. 2A. FIG. 3B is an enlarged view of a portion enclosed by dotted lines in FIG. 2B. FIG. 3C is a cross-sectional view of the supporting member 9 taken along line IIIC-IIIC of FIG. 2B.

As illustrated in FIG. 3A, part of the inner wall surface 2c of the first path 2a is referred to as an opposing surface 2d. As illustrated in FIG. 3B, when the opening of the TGV 4 becomes minimal, the opposing surface 2d opposes a distal end 4e of the valve 4a located away from the shaft 4b with a clearance Sa maintained therebetween. In other words, when the opening of the TGV 4 of the valve 4a is minimal, the clearance Sa is created between the inner wall surface 2c (opposing surface 2d) where a flow of intake air is reduced or eliminated and the distal end 4e of the valve 4a.

As described above, the clearance Sa provided between the opposing surface 2d and the distal end 4e of the valve 4a can mitigate damage to the motor resulting from contact between the opposing surface 2d and the distal end 4e of the valve 4a.

In addition, a stepped surface 2e projecting downward (toward the second path 2b) from the opposing surface 2d in FIG. 2A is formed on the inner wall surface 2c. The stepped surface 2e is formed in the opposing surface 2d in a continuous manner in the downstream direction in which intake air flows.

As illustrated in FIG. 3B, when the opening becomes minimal, the distal end 4e of the valve 4a comes to oppose the stepped surface 2e from the upstream side. More specifically, the stepped surface 2e is located on the intake port 5 side of the distal end 4e of the valve 4a associated with the opening being minimized (namely, located to the right of the distal end 4e in FIG. 3B).

In addition, an extension surface 2f is formed on the inner wall surface 2c on the intake port 5 side of the stepped surface 2e. The extension surface 2f is formed in a continuous manner so as to continue from the stepped surface 2e, extending from the stepped surface 2e toward the intake port 5.

As described above, when the opening becomes minimal, the opposing surface 2d, the stepped surface 2e, and the extension surface 2f, all of which are provided on the inner wall surface 2c, contribute to a reduction in clearance between the stepped surface 2e and the distal end 4e of the valve 4a in addition to the clearance Sa between the opposing surface 2d and the distal end 4e of the valve 4a, thereby enabling the amount of intake air flowing into the first path 2a to be reduced or eliminated, as illustrated in FIG. 3B.

During manufacturing, a thickness gauge or the like is inserted into the clearance Sa to check whether or not the clearance Sa falls within a designated range. As described above, the intake manifold 8 and the supporting member 9 are coupled to each other, while the supporting member 9 and the cylinder head 10 are coupled to each other (see FIGS. 2A and 2B). For instance, during manufacturing, the intake manifold 8 and the supporting member 9 are coupled to each other by means of welding or the like before the supporting member 9 and the cylinder head 10 are coupled to each other.

In this case, since the clearance Sa may be changed as a result of the welding, the clearance Sa needs to be measured by inserting the thickness gauge into the first path 2a from the downstream side after the intake manifold 8 and the supporting member 9 are welded to each other.

However, if the stepped surface 2e is provided on the inner wall surface 2c of the first path 2a, the clearance Sa between the inner wall surface 2c and the distal end 4e of the valve 4a is not visible when the first path 2a is viewed from the downstream side, which makes it difficult to measure the clearance Sa even by inserting the thickness gauge into the first path 2a from the downstream side.

To overcome such an issue, a measurement groove 2g is provided in the extension surface 2f in this example, as illustrated in FIGS. 3A, 3B, and 3C. In FIG. 3C, the measurement groove 2g extends rightward (toward the intake port 5) from the stepped surface 2e in the direction in which intake air flows.

An end 2h on the stepped surface 2e side of the measurement groove 2g is flush with a portion continuous with the stepped surface 2e of the opposing surface 2d. More specifically, the end 2h on the stepped surface 2e side of the measurement groove 2g is formed in the opposing surface 2d in a continuous manner. In addition, in FIG. 3C, the measurement groove 2g gradually becomes shallower toward the right side (intake port 5) from the end 2h on the stepped surface 2e side.

As described above, before the supporting member 9 is mounted on the cylinder head 10, the measurement groove 2g allows easy measurement of the clearance Sa by enabling the thickness gauge to be inserted into the measurement groove 2g from a downstream end (the other end 9b) of the supporting member 9 when the opening of the TGV 4 is minimal.

Figure 4:
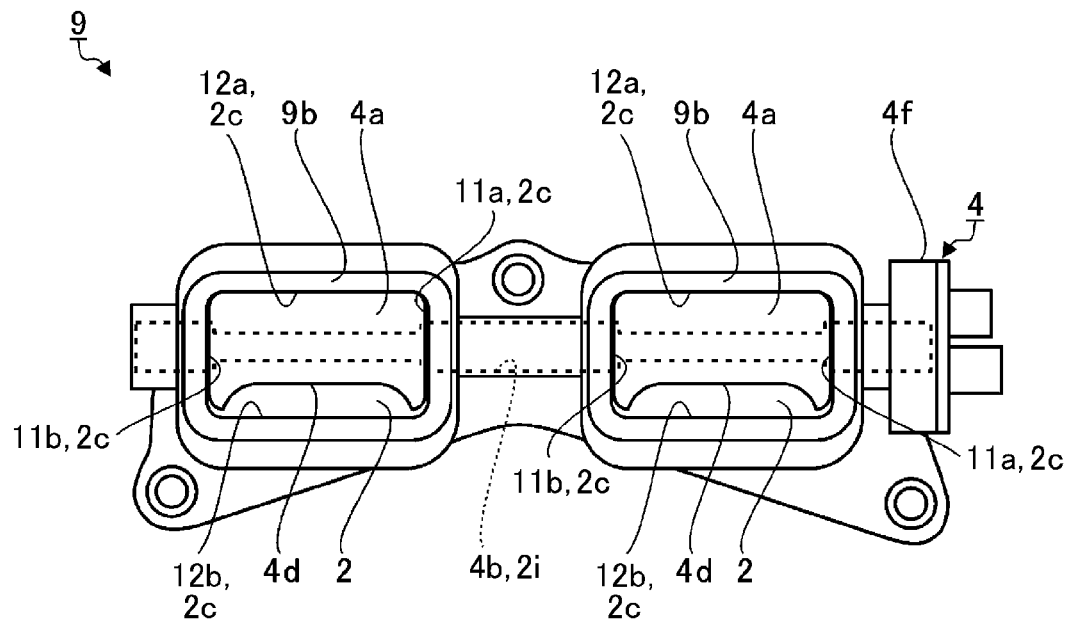
FIG. 4 is a view of a supporting member, as seen from the other end.

FIG. 4 is a view of the supporting member 9, as seen from the other end 9b. As illustrated in FIG. 4, the inner wall surface 2c in a portion (where the valve 4a is disposed) formed by the supporting member 9 of the air intake passage 2 has a rectangular shape with four substantially rounded corners in a cross-section perpendicular to the direction in which intake air flows.

More specifically, the inner wall surface 2c of the air intake passage 2 has two shorter portions 11a, 11b and two longer portions 12a, 12b. The two shorter portions 11a, 11b oppose each other, while the two longer portions 12a, 12b oppose each other. In addition, the longer portion 12a extends longer than the shorter portion 11a.

Two of the air intake passages 2 are juxtaposed in the supporting member 9 and are coupled to different cylinders (combustion chambers 7). The supporting member 9 has an insertion hole 2i that is opened to the two shorter portions 11a, 11b of the inner wall surface 2c. The insertion hole 2i opens into the two air intake passages 2, and the shaft 4b is inserted therethrough.

As illustrated in FIG. 4, the shaft 4b projects rightward from the supporting member 9, and such a projecting portion is coupled to the motor 4f mounted on the supporting member 9 from the outside. Since each of the two air intake passages 2 has the valve 4a of the TGV 4, two of the valves 4a in total are secured to the shaft 4b. Accordingly, the two valves 4a open/close simultaneously when the shaft 4b is rotated by the motor 4f.

Figure 5:
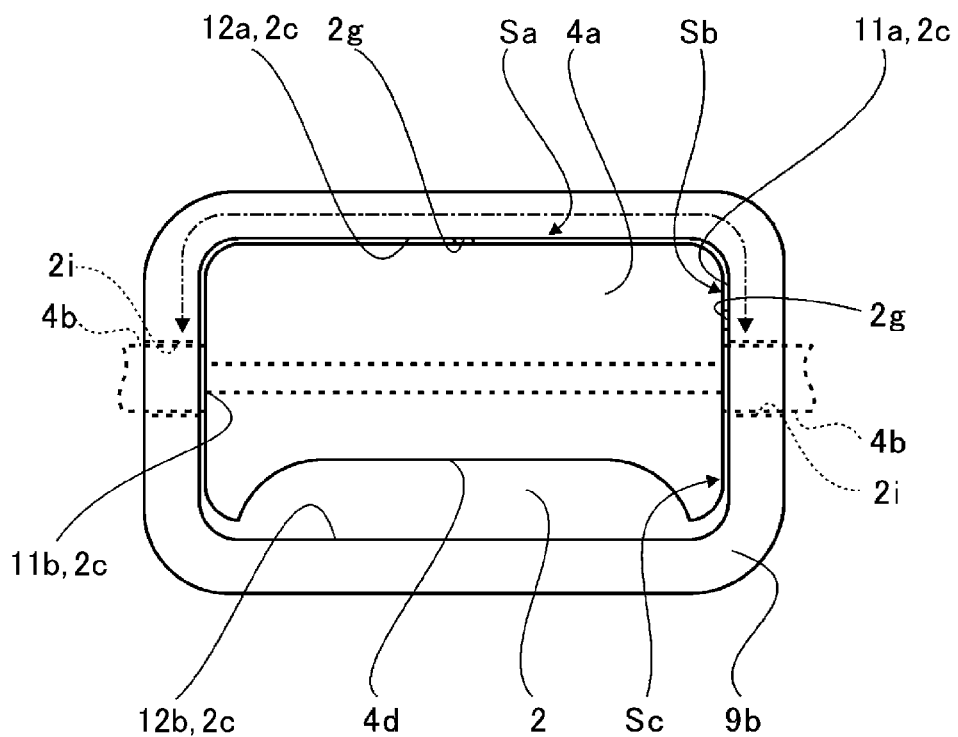
FIG. 5 is an explanatory diagram illustrating portions where a measurement groove is formed.

FIG. 5 is an explanatory diagram of a portion where the measurement groove 2g is formed, illustrating one of the air intake passages 2 in FIG. 4 in an enlarged view. In FIG. 5, the stepped surface 2e extends from the upper longer portion 12a (any one of the right and left longer portions 12a) to a point between the right and left shorter portions 11a, 11b (a region where the stepped surface 2e extends is indicated by a double arrow in FIG. 5). More specifically, the stepped surface 2e is formed over the entire inner wall surface 2c on the first path 2a side excluding the second path 2b side.

In other words, in the shorter portion 11a, the stepped surface 2e extends from the upper longer portion 12a to above the insertion hole 2i (on the longer portion 12a side) in FIG. 5.

The measurement groove 2g is provided in each of the upper longer portion 12a and the shorter portion 11a in FIG. 5. The thickness gauge is inserted into the clearances Sa, Sb through the two measurement grooves 2g. In addition, the thickness gauge is inserted into a clearance Sc through a portion below the insertion hole 2i in FIG. 5 such that the clearances Sa, Sb, and Sc, three points in total, are subjected to measurement. Since the clearance Sc is outside the region where the stepped surface 2e is provided, measurement of the clearance Sc is possible even if the measurement groove 2g is not provided.

As described above, the measurement groove 2g provided in each of the longer portion 12a and the shorter portion 11a enables the measurement of the clearance Sa on the longer portion 12a side between the inner wall surface 2c and the distal end 4e of the valve 4a as well as the measurement of the clearances Sb, Sc on the shorter portion 11a side between the inner wall surface 2c and the valve 4a. Consequently, this arrangement enables the measurement of misalignment of the valve 4a both in the vertical and horizontal directions as well as the measurement of misalignment resulting from the inclined valve 4a in FIG. 5.

Although the present invention has been described above in terms of a preferred example with reference to the attached drawings, the present invention is not limited to the foregoing preferred example. Needless to say, various modifications are conceivable within the scope of the present invention.

For instance, in the example described above, the inner wall surface 2c of the air intake passage 2 has the two shorter portions 11a, 11b and the two longer portions 12a, 12b in a cross-section perpendicular to the direction in which intake air flows. In addition, the stepped surface 2e extends from any one of the right and left upper longer portions 12a to a point between the right and left shorter portions 11a, 11b. However, the inner wall surface 2c of the air intake passage 2 may be any shape in cross-section perpendicular to the direction in which intake air flows. In addition, the stepped surface 2e may be provided in only one of the right and left longer portions 12a without extending to the two shorter portions 11a, 11b. However, if the stepped surface 2e extends from any one of the right and left upper longer portions 12a to a point between the right and left shorter portions 11a, 11b, air leakage from the clearances Sa, Sb can be further reduced when the opening of the TGV becomes minimal.

In addition, although, in the two shorter portions 11a, 11b, the stepped surface 2e extends to a side of one of the longer portions 12a without extending to the insertion hole 2i in the example described above, the stepped surface 2e may be provided on either one of the shorter portions 11a, 11b. However, if the stepped surface 2e extends to a side of one of the longer portions 12a without extending to the insertion hole 2i in the shorter portions 11a, 11b, air leakage can be reduced or eliminated by the stepped surface 2e over the entire inner wall surface 2c of the first path 2a.

Furthermore, although one of the measurement groove 2g is provided for each of one of the longer portions 12a and one of the shorter portions 11a in the example described above, one of the measurement groove 2g or three or more of the measurement grooves 2g may be provided. However, if one of the measurement groove 2g is provided for each of one of the longer portions 12a and one of the shorter portions 11a, misalignment in inclination of valve 4a can also be detected while the number of the measurement grooves 2g is minimized.

The present invention can be applied to an engine air intake structure provided with a partition plate that divides an air intake passage in an engine.

The invention claimed is:

1. An engine air intake structure having a partition plate that partitions an air intake passage in communication with an intake port into a first path and a second path in an intake air flow direction and a plate-like valve that is disposed in the air intake passage and that is secured to a shaft, in which the opening of the first path is variable through the rotation of the valve coupled with the shaft around the shaft, the structure comprising:

an opposing surface that is part of an inner wall surface of the air intake passage and opposes an end of the valve with a clearance maintained therebetween when the opening becomes minimal, the end being located away from the shaft;

a stepped surface that is located on the intake port side of the end of the valve associated with the opening being minimal and that stands erect from the opposing surface toward the second path;

an extending surface that extends from the stepped surface toward the intake port; and at least one measurement groove that is formed in the extending surface so as to extend from the stepped surface toward the intake port.

2. The engine air intake structure according to claim 1, wherein a portion of the inner wall surface of the air intake passage where the valve is disposed has two shorter portions opposing each other and two longer portions that extend longer than the shorter portions and oppose each other in a cross section perpendicular to the intake air flow direction;

wherein the opposing surface is formed in one of the longer portions; and wherein the stepped surface extends from the one of the longer portions to a point between the two shorter portions.

3. The engine air intake structure according to claim 2, further comprising:

an insertion hole that is formed in the two shorter portions of the inner wall surface and through which the shaft is inserted, the insertion hole being formed to pivotally support the shaft, wherein, in the shorter portions, the stepped surface extends to a side of the one of the longer portions without extending to the insertion hole.

4. The engine air intake structure according to claim 3, the at least one measurement groove includes two measurement grooves; and wherein the measurement grooves are provided respectively in the one of the longer portions and one of the shorter portions.

* * * * *